US009306954B2

(12) United States Patent
Movassaghi

(10) Patent No.: US 9,306,954 B2
(45) Date of Patent: Apr. 5, 2016

(54) APPARATUS, SYSTEMS AND METHOD FOR VIRTUAL DESKTOP ACCESS AND MANAGEMENT

(75) Inventor: Safa Movassaghi, Mission Viejo, CA (US)

(73) Assignee: Cloud Security Corporation, Mission Viejo, CA (US)

( * ) Notice: Subject to any disclaimer, the term of this patent is extended or adjusted under 35 U.S.C. 154(b) by 223 days.

(21) Appl. No.: 13/173,220

(22) Filed: Jun. 30, 2011

(65) Prior Publication Data
US 2013/0007465 A1    Jan. 3, 2013

(51) Int. Cl.
*H04L 29/06* (2006.01)
*G06F 21/32* (2013.01)
*G06F 21/34* (2013.01)
*G06F 21/84* (2013.01)

(52) U.S. Cl.
CPC .............. *H04L 63/105* (2013.01); *G06F 21/32* (2013.01); *G06F 21/34* (2013.01); *G06F 21/84* (2013.01); *H04L 63/08* (2013.01)

(58) Field of Classification Search
CPC ......... G06F 1/1613; G06F 1/163; G06F 3/00; H04L 1/0005

USPC .............. 726/2, 4–6, 9, 17–21; 713/153, 161, 713/168, 170–172, 185, 189; 718/1, 718/100–102
See application file for complete search history.

(56) References Cited

U.S. PATENT DOCUMENTS

| | | | |
|---|---|---|---|
| 6,615,264 | B1 | 9/2003 | Stoltz et al. |
| 2002/0169967 | A1 | 11/2002 | Varma et al. |
| 2006/0206931 | A1 | 9/2006 | Dillaway et al. |
| 2007/0180509 | A1* | 8/2007 | Swartz et al. ............ 726/9 |
| 2007/0266421 | A1 | 11/2007 | Vaidya et al. |
| 2007/0282881 | A1 | 12/2007 | Relyea |
| 2008/0098478 | A1 | 4/2008 | Vaidya et al. |
| 2009/0319782 | A1 | 12/2009 | Lee |
| 2010/0115291 | A1* | 5/2010 | Buer ..................... 713/192 |
| 2012/0110281 | A1* | 5/2012 | Green et al. ............. 711/154 |
| 2012/0275600 | A1* | 11/2012 | Arnold et al. ............ 380/277 |
| 2013/0036456 | A1* | 2/2013 | Boysen et al. ............ 726/4 |

* cited by examiner

*Primary Examiner* — Joseph P Hirl
*Assistant Examiner* — Leynna Truvan
(74) *Attorney, Agent, or Firm* — Alleman Hall McCoy Russell & Tuttle LLP

(57) ABSTRACT

Systems and methods are provided for accessing and managing a virtual desktop. In some examples a desktop access manager may be provided to enable and communicatively link a virtual desktop key such that a user may access a linked desktop virtually over a second computing device. The systems and methods provide increased security when accessing a virtual desktop and enable customization of access to the virtual desktop.

21 Claims, 9 Drawing Sheets

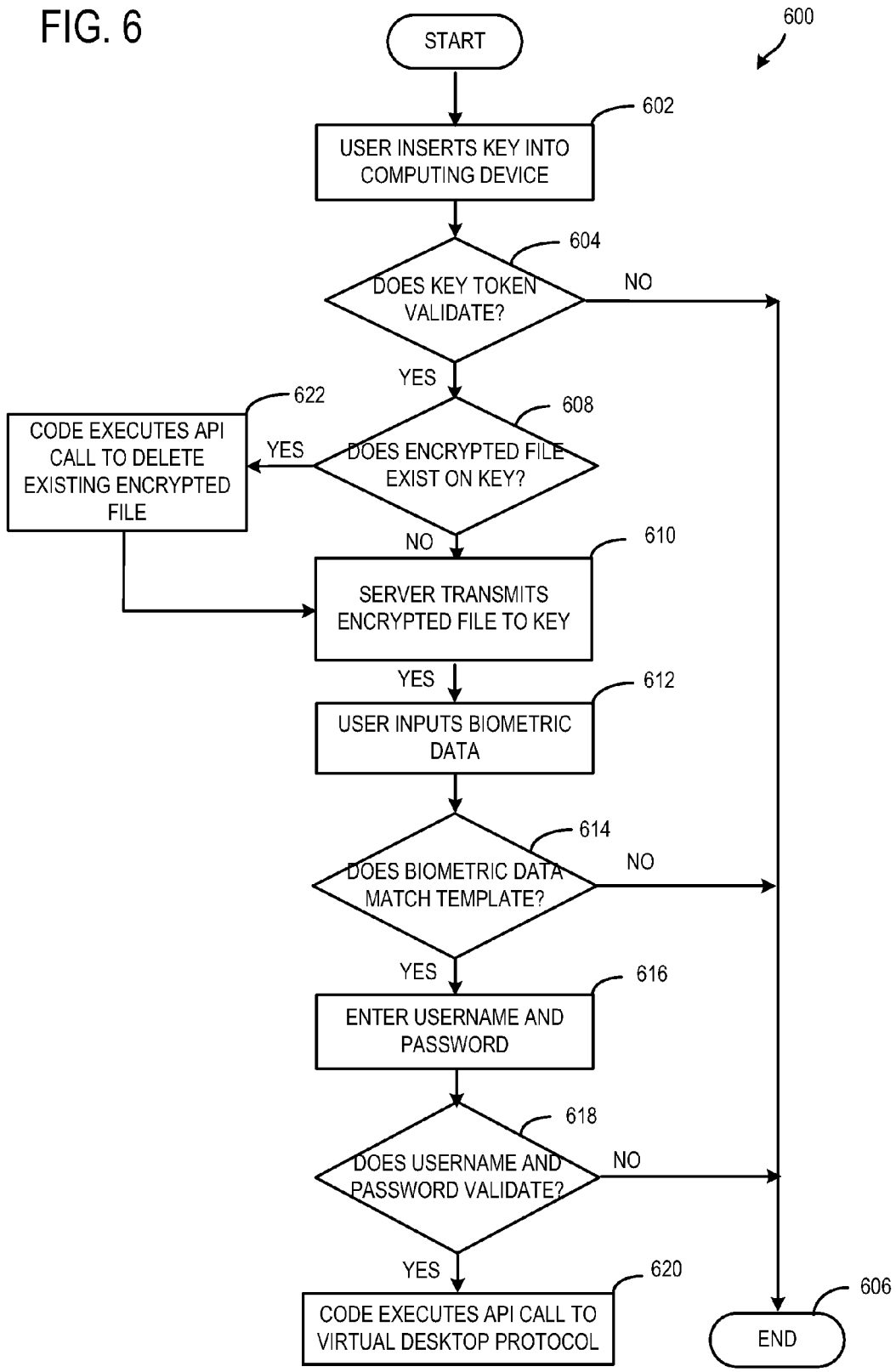

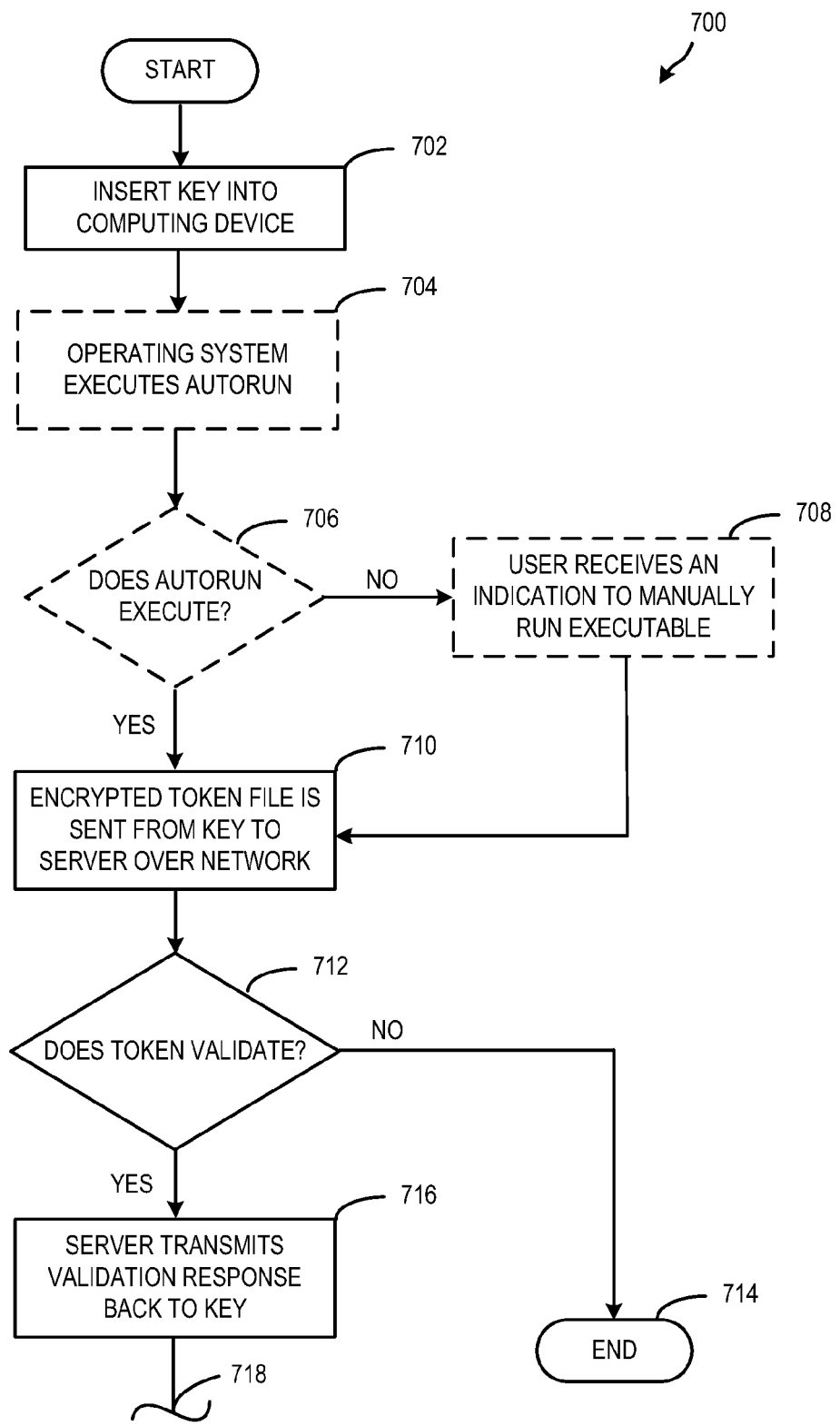

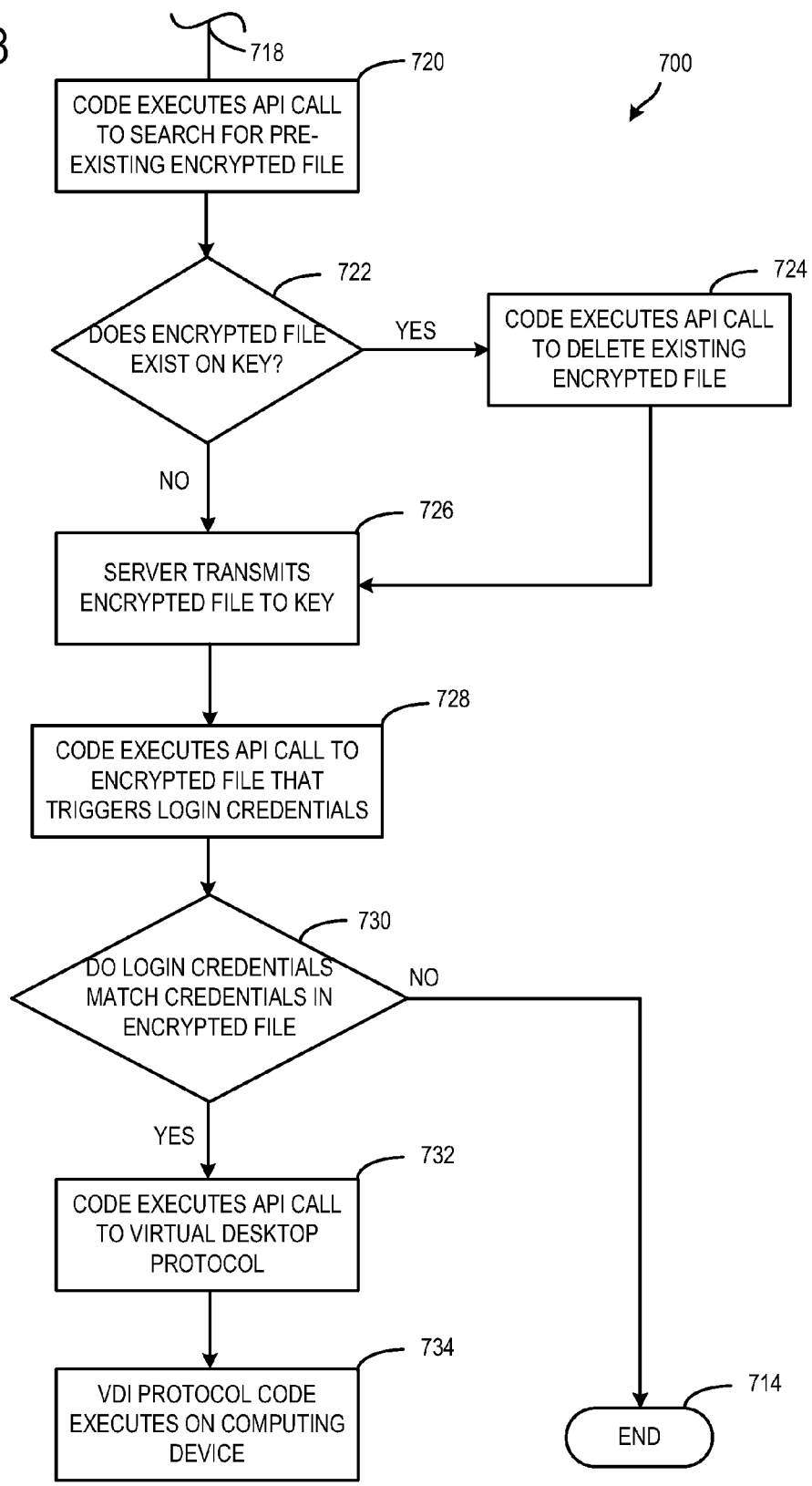

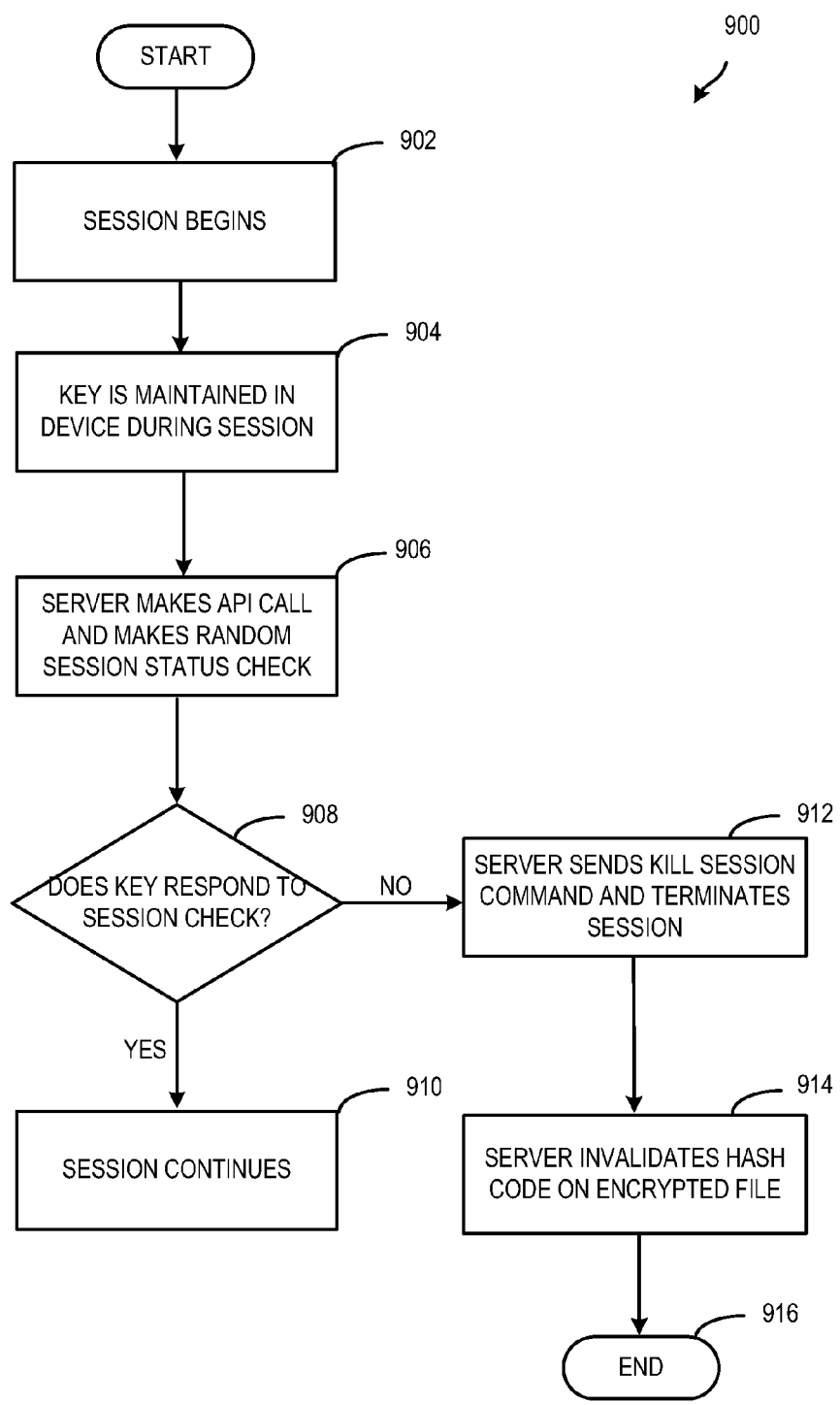

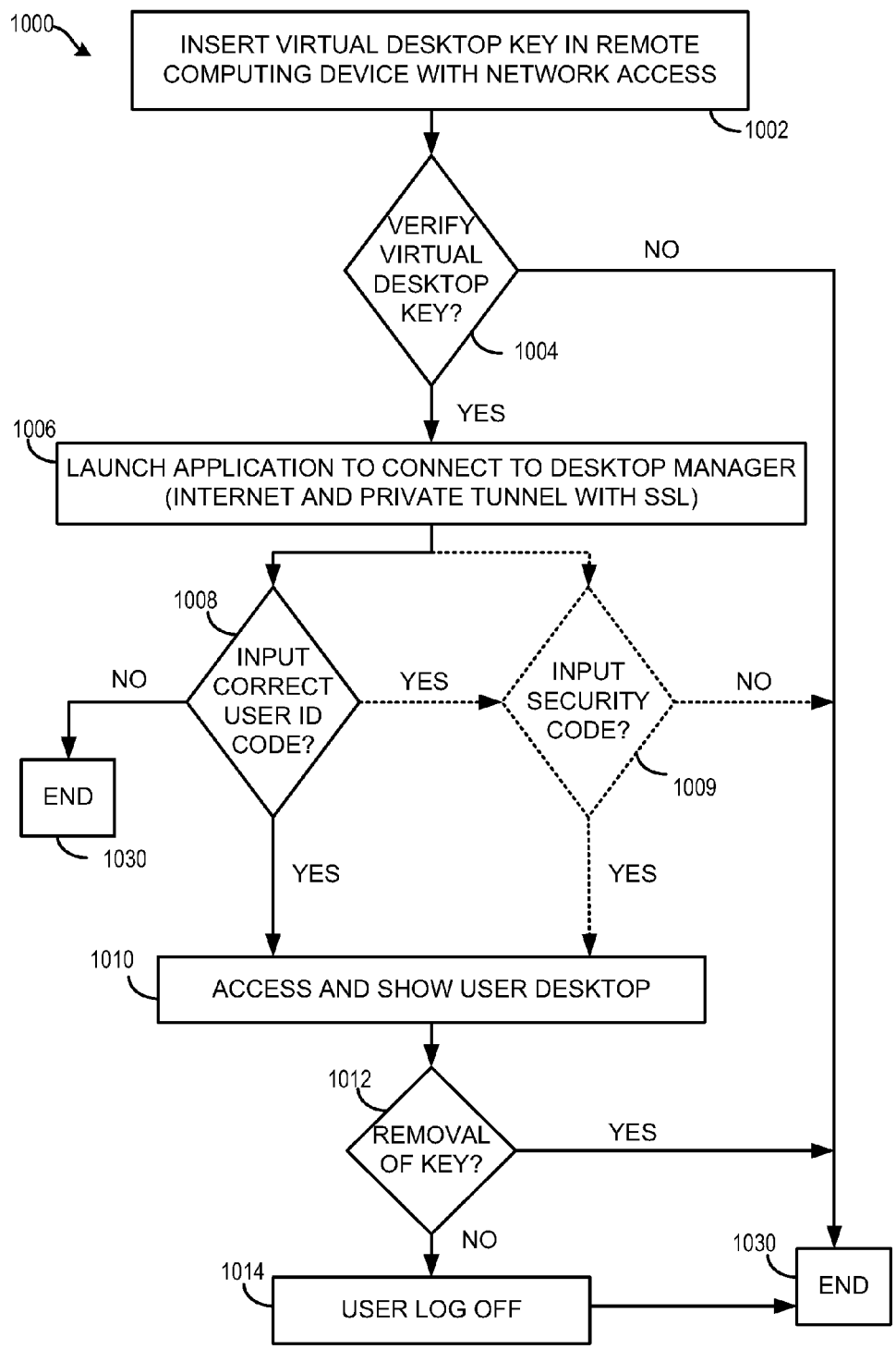

APPARATUS, SYSTEMS AND METHOD FOR VIRTUAL DESKTOP ACCESS AND MANAGEMENT

FIELD

The present disclosure relates generally to apparatus, systems and methods for virtual desktop access and management.

BACKGROUND AND SUMMARY

With the development of the computer as both a business tool and a personal communication device, users have grown accustomed to use of select features on their desktop computer. Further, users have become accustomed to the graphic display and customized organization of programs as available on their desktop. Difficulty in accessing a user's desktop from a remote computer or system can cause confusion and frustration. Further, in some examples, it is not possible to provide a secure interface to a user's desktop computing device and thus access is limited or not possible. In addition, user's experiences when attempting to access their desktop, such as when they are traveling, provides additional frustrations.

Solutions to the need for remote access to a user's desktop have been addressed in numerous ways. For example, some users carry laptops or other computing devices which have been preset to communicatively link with their home or business server. Carrying the laptops or other computing devices can be difficult and have been a frustrating solution for some. In other solutions, users must access their system though a complicated series of remote links. Security with these remote links remains a significant concern.

The inventor herein has recognized difficulties with the current remote system solutions and applications which enable remote access to a user's desktop. To address these difficulties and as described in more detail below, the inventor herein provides an apparatus, systems and methods for access and management of a user's virtual desktop. In one example, a desktop access manager may be configured to communicatively link a remote computing device when a virtual desktop key is coupled to the remote computing device. The virtual desktop key, after authentication, may provide immediate access to a user's desktop. It should be appreciated that these apparatus, systems and methods provide increased security, enable ease of use and reduce user frustration with current application systems. Further, the disclosed systems and methods enable customization to further enhance the experience of accessing and managing a user's system or desktop remotely.

BRIEF DESCRIPTION OF THE FIGURES

The disclosure is illustrated by way of example and not by way of limitation in the figures of the accompanying drawings, in which the like references indicate similar elements and in which:

FIG. 6 shows an example flow chart for user access to the virtual desktop access and management system of FIG. 1.

FIG. 7 shows an example flow chart for executing the virtual desktop access and management system of FIG. 1.

FIG. 8 shows a continuation of the example flow chart of FIG. 7.

FIG. 9 shows an example flow chart for a status check of the virtual desktop access and management system of FIG. 1.

FIG. 10 provides an example flow chart for a virtual desktop access and management method according to an embodiment of the present disclosure.

DETAILED DESCRIPTION

Figure 1:
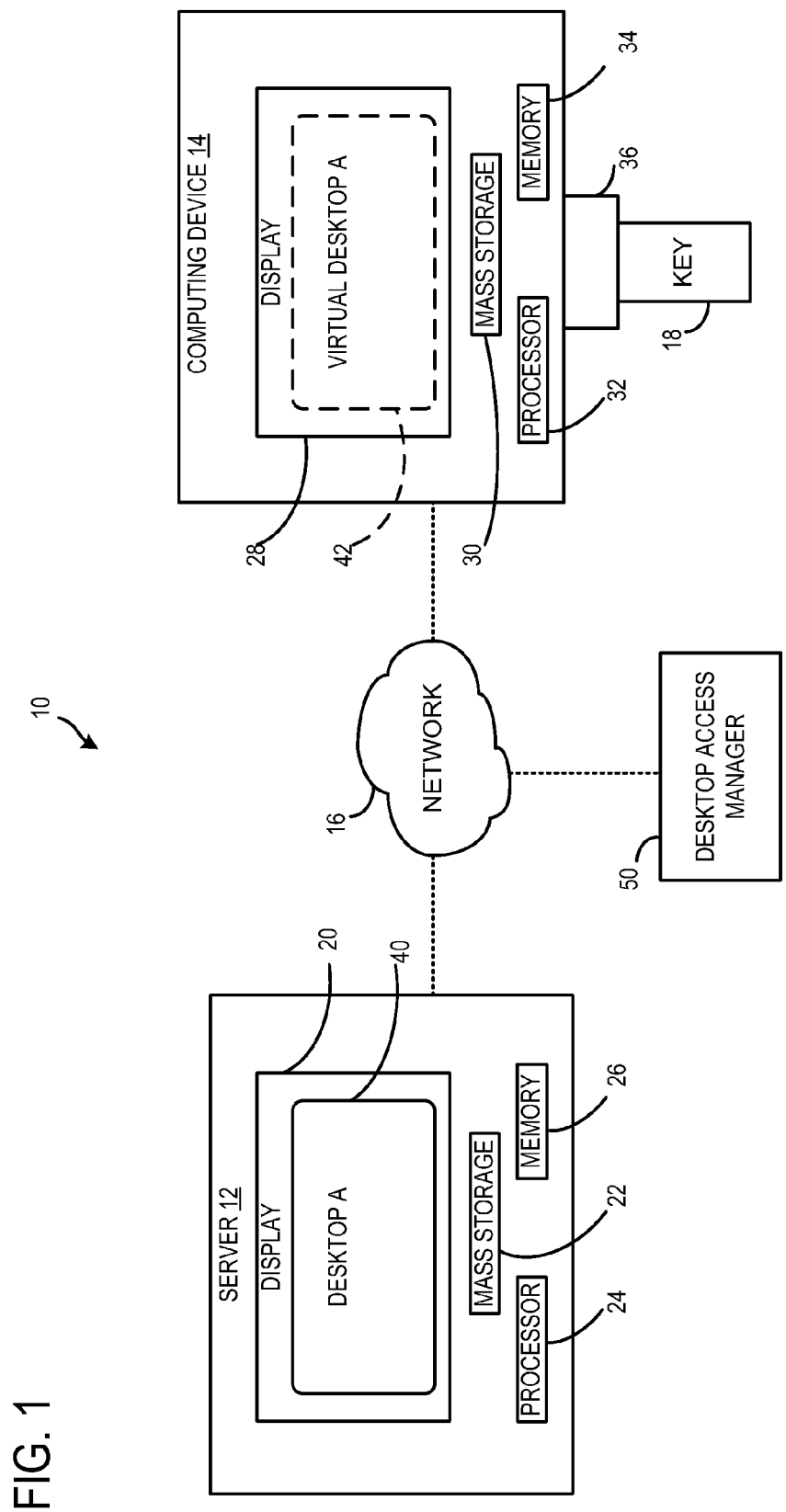
FIG. 1 shows an exemplary schematic illustration of a virtual desktop access and management system according to an embodiment of the present disclosure.

FIG. 1 shows an exemplary schematic illustration of a virtual desktop access and management system 10 according to an embodiment of the present disclosure. As described below, the system enables a user of a virtual desktop key to access and manage a select desktop from a remote system.

As depicted in FIG. 1, virtual desktop access and management system 10 may include a first computing device 12, a second computing device 14, a network 16, and a virtual desktop key 18. The first and second computing device may be any suitable computing devices, such as a computing device that enables a user to store and maintain images and/or data. For example, the first and/or second computing device may be a smart phone, a hand-held computing device, a mobile device, a laptop computer, a portable media player, a desktop computer, etc. In some embodiments, the computing devices may run an identifiable operating system's software, such as a WINDOWS operating system or other system, and may provide a standardized interface and platform for applications. The computing devices may be networked to one or more networks 16, such as a public network (e.g. the Internet), to enable communication between the computing devices and other elements included in the virtual desktop access and management system.

The first computing device 12 may include a display 20 configured to present images and/or graphics on the device. The first computing device may also include a communication apparatus facilitating wired and/or wireless communication between the computing device and external systems and devices such as through network 16. Computing device 12 may be configured to provide a user a customized display, indicated as Desktop A at 40. As depicted the first computing device may include various software applications stored on mass storage 22 (e.g., a hard drive, solid state memory, a rewritable disc, etc.) and executable via a processor 24 using portions of memory 26. Similarly, second computing device 14 may include a display 28, mass storage 30, a processor 32, and memory 34. It should be appreciated that second computing device, as a remote computing device, includes any device that is not coupled directly to the local network. Thus, a remote computing device may be a computing device in a hotel business center, a lobby, airport, client sites, etc. In addition, a remote computing device may be a third party computer or other computer in the same room or facility as first computing device, where such computer is not locally connected to the first computing device.

In one example, second computing device 14 may further include a communication port 36, such as a USB port or connector. Virtual desktop key 18 may be adapted to be received within port 36 and provides access to virtual Desktop A as indicated at 42. Virtual Desktop A includes the personalized environment that includes user-specific applications and displays from Desktop A, including, but not limited to user email accounts, user stored files, user documents, etc. Further, in some embodiments, Desktop A may include a server environment, such that Desktop A is coupled or linked to one or more servers which can be accessed through Desktop A. Thus, a user may be able to use any second computing device (e.g. computing device 14) and virtual desktop key 18 enables virtual instant or substantially instant access to a user's customized desktop (Desktop A) from first computing device 12.

In some examples, virtual desktop key 18 acts as a USB memory card specially programmed to connect via the network 16 (such as the Internet) to user's desktop environment automatically. By providing the virtual desktop key, the complexity of a user attempting to access their desktops from a remote computer is eliminated. As such, in one example, a user may carry the key in their wallet or on their key chain and without the need to carry a lap top or other system, the user may plug the key into a remote networked computing system, such as through the USB port. It should be appreciated that once the virtual desktop key is set-up, the virtual access key is configured to enable a user, after identification, to automatically connect to a user's desktop. As such, users can utilize existing desktop or server environments.

In some systems, once a virtual desktop key is plugged into a second computing device, a user may need to validate or provide identification to enable the functionality of the key and provide access to a user's desktop. For example, one or more user passwords may need to be inputted to enable the key to provide access to the user's desktop. The security of the virtual desktop key may be built in. For example, there may be support for HTTPS, certificate or token: for example, 256 DES security.

Once the validation of the virtual desktop key has occurred, a user may have secured access to their virtual desktop. The virtual desktop key may provide support to any number of operating system environments, including but not limited to a MICROSOFT WINDOWS environment, an APPLE environment, an open source environment, etc. The user may be able to modify documents, browse the Internet, enter data, store information, check or receive email, etc. Changes may be saved such that the changes (such as data additions or deletions) are available on Desktop A, when Desktop A is again accessed through first computing device and/or another remote computing device. For example, changes made to Virtual Desktop A may be stored on virtual desktop key 18 so that Desktop A is updated when virtual desktop key 18 is coupled to first computing device 12. As another example, changes made to Virtual Desktop A may be stored by desktop access manager 50 which may update first computing device 12 via network 16. In yet another example, changes made to Virtual Desktop A may be automatically updated on first computing device 12 without desktop access manager 50. Changes to Desktop A may be updated in real-time, at predetermined intervals during a session, and/or at the end of a session. Saving changes prevent interruption and redundancy by the user.

In some examples, and as briefly described above, a desktop access manager 50 may be communicatively linked with one or more of the virtual desktop key 18, the first computing device 12, and/or the second computing device 14 through network 16. The desktop access manager 50 may be a remote computing device or server and the desktop access manager may be configured to manage virtual access to user's desktops. Management of the virtual access may include tracking use and validating a user's identification or password. Further, management may include enabling security between the first computing device and the second computing device. In some examples, desktop access manager 50 enables saving of changes which occur when changes are made through a second computing device to Desktop A, as described above.

It will be appreciated that desktop access manager 50 may be configured to manage a plurality of desktops. Therefore, a storage device associated with desktop access manager 50 may be configured to store data for a plurality of virtual desktops. In this way, desktop access manager 50 manages a plurality of users such that each user may access their personal virtual desktop through any computing device using a virtual desktop key, as described above.

It is noted that in some examples, the desktop access manager may provide a back-up for disaster recovery. Further, in some systems, the desktop access manager may provide virus protection, including one or more of scans, continuous snakes, monitoring and virus protection applications, reporting systems and protections from malware and virus attacks.

The desktop access manager and virtual desktop key may work independently of the host computing device that it is connected. For example, users can access their desktop from the virtual desktop key and bypass the host computing device's software and gain access to the software from their desktop.

The use of the virtual desktop key with the desktop access manager in the system described above provides instant and automatic user access to a user's desktop. Further, such a system minimizes administration intervention while providing a private, secure cloud based computing resource. The single point of administration reduces costs making an efficient, highly secure system. Moreover, the single management point reduces complexities of application distribution and management and IT staff requirements for enabling current systems. Moreover, users are familiar with the use of physical keys such that the systems enable ease-of-use.

Figure 2:
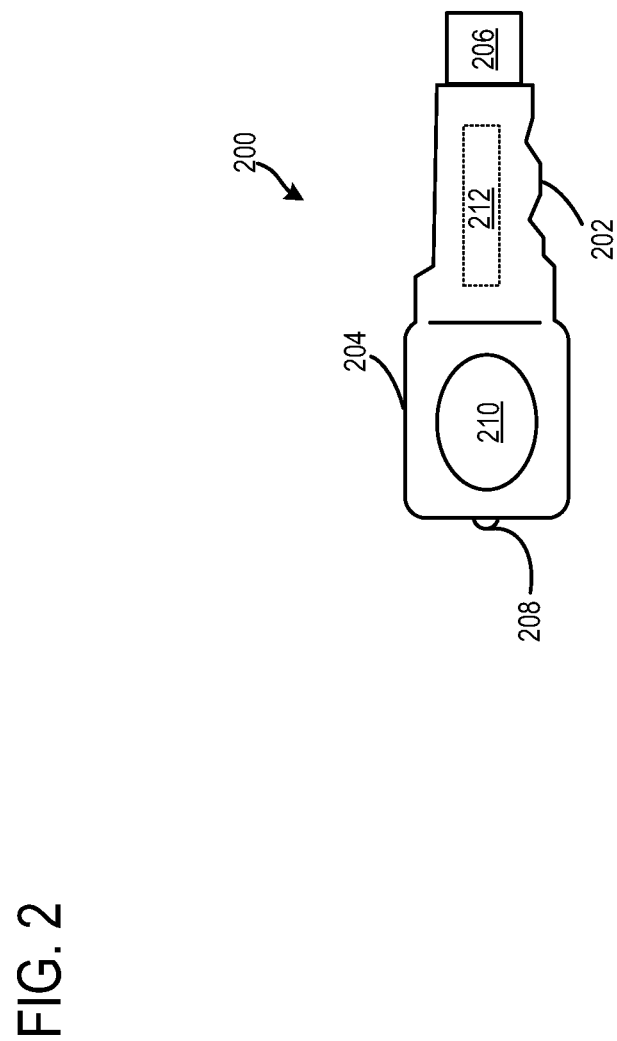
FIG. 2 shows an example virtual desktop key for use in the virtual desktop access and management system shown in FIG. 1, according to an embodiment of the present disclosure.

FIG. 2 provides an illustrated example of a virtual desktop key. As shown, key 200 may be physically shaped to resemble a standard house or car key shape. For example, the key may include a blade 202 with various cut-outs or edges, as well as a bow 204 or handle which protrudes from the blade. Extending from the blade 202, may be USB drive 206. As with physical keys, the virtual desktop key may be configured to operate a single lock—access to a user's virtual desktop. In some examples, the USB drive may be retractable or otherwise protected, such as through a cap, to reduce wear on the USB drive. It will be appreciated that key 200 may be configured to be received by other communication ports capable of transmitting data, and USB drive 206 is provided as a non-limiting example. Although not required, the familiar shape of the physical key enables a user to feel comfort and recognition with the device.

It is further noted that that virtual desktop key 200 may further include a key ring connector, such as a loop 208 or hole (not shown) to enable a user to couple the virtual desktop key to a key chain or other location.

In addition, virtual desktop key 200 may also include indicia 210. The indicia may enable a user to easily identify the key and/or may provide promotional opportunities to a related business, etc.

Although shown in FIG. 2 in the shape of a key, it should be appreciated that other configurations are possible. Further, other configurations of the key shape are also possible, where the handle and/or blade is extended or shortened, where the cut-outs are more extensive or are on both sides of the blade, etc. The illustration is provided for example only and is not intended as a limitation.

In some embodiments, virtual desktop key 200 may have radio frequency (RF) capability. For example, virtual desktop key 200 may include a RF transceiver and/or receiver, indicated at 212. As such, virtual desktop key 200 may communicate with any device with RF capability via radio waves.

Further, in some embodiments, virtual desktop key 200 may be configured to verify a user via biometrics. As one non-limiting example, virtual desktop key 200 may include a scanning device to read a fingerprint or thumbprint of a user. Such a scanning device may be included on a portion of virtual desktop key 200, for example on bow 204. In this way, virtual desktop key 200 may be configured to biometrically identify a user. It will be appreciated that the virtual desktop key 200 may be configured to grant access to a user's desktop using virtually any type of verification technique. Further, virtual desktop key 200 may be customizable by a user to impart various levels of security.

Figure 3:
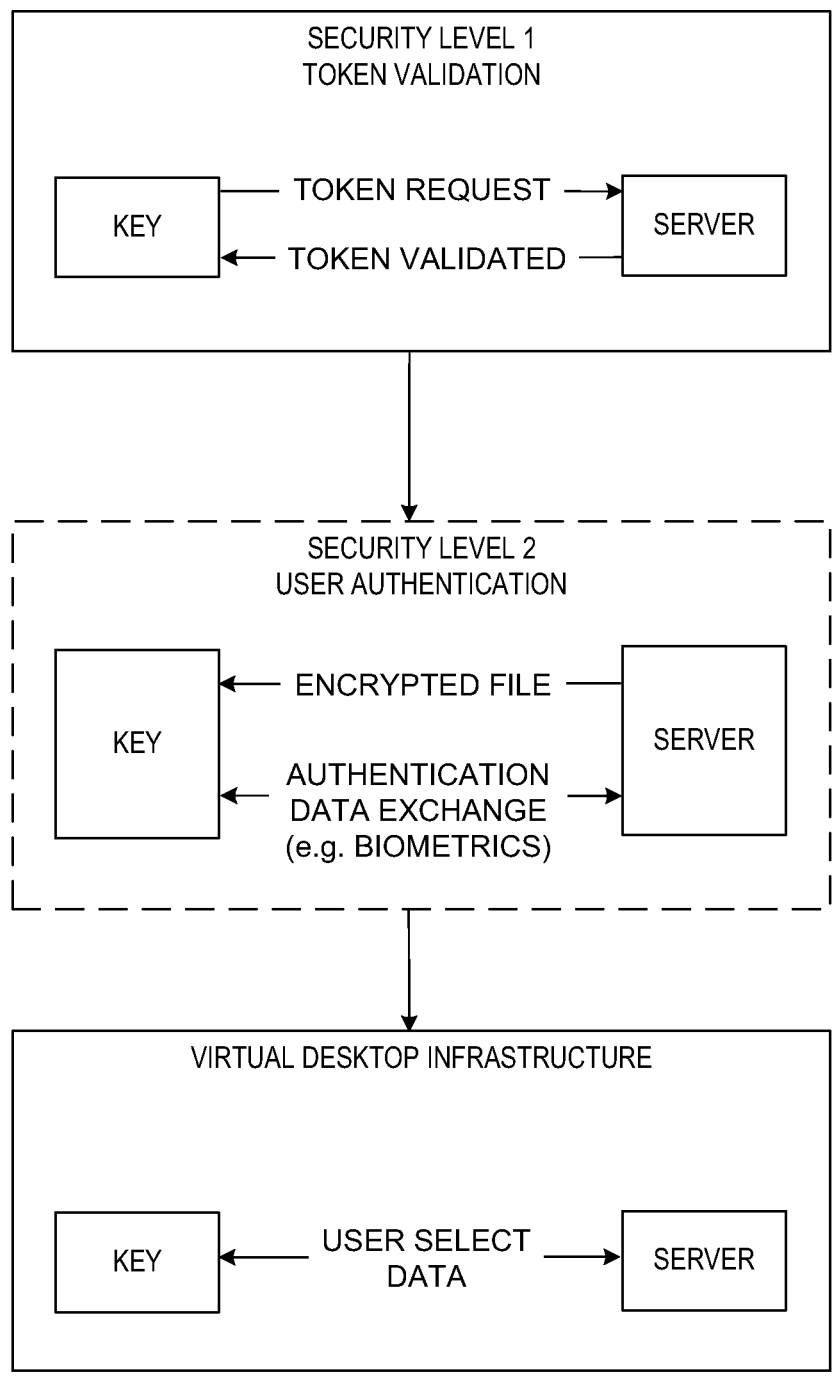
FIG. 3 schematically shows example communication pathways of the virtual desktop access and management system of FIG. 1.

FIG. 3 schematically shows example communication pathways 300 of the virtual desktop access and management system of FIG. 1. As described in detail below, various types of data may be communicated between key 302 and server 304. It will be appreciated that key 302 is a virtual desktop key, as described above with reference to FIGS. 1 and 2. Further, it is to be understood that server 304 may include virtual desktop manager 50 of FIG. 1, and therefore, is configured to manage remote access to a virtual desktop.

As shown in FIG. 3, various security levels may be included to validate a token associated with key 302, and may optionally include one or more methods to authenticate a user of key 302. Each security level may be associated with data being transferred between key 302 and server 304.

For example, as shown at 306, security level 1 may be associated with token validation. When key 302 is in coupled to server 304 via a network as described above, key 302 may be validated via a token. For example, key 302 may send a message to server 304 requesting token validation. In response, server 304 may send a message to key 302 that indicates the token has been validated. Alternatively, the token request may be not be validated, if the token validation code is not satisfied. The following represents example code that may be executed for token validation; however it will be appreciated that other code may be executed without departing from the scope of this disclosure.

```
private void Form1_Load(object sender, EventArgs e)
{
Cursor = Cursors.WaitCursor;
//GetUSBStatus( );
//710:Encrypted Token file is sent from key to server over network
CrypticInfo myToken=null;
FileHelper fh = new FileHelper( );
bool goodToken = false;
if (fh.TokenFileExists( ))
{
myToken = fh.GetTokenFromFile( );
goodToken = TestToken(myToken.GetToken( ));
//If the file exists but the token is invalid, the status
//can be reset making the key usable again.
}
else
{
myToken = new CrypticInfo("Bad Key", DateTime.Now);
//"Bad Key" will need to be changed to something more random
goodToken = false; //Just to make sure.
```

-continued

```
//This condition will render the key completely inoperable.
}
//712:Does Token Validate?
if (goodToken)
{
MessageBox.Show(myToken.GetToken( )+"-is a valid token");
//716:Server transmits validation response back to key
fh.DecryptFiles(myToken.GetToken( ));
//718:Protected data is available to run
}
else
{
MessageBox.Show(myToken.GetToken( )+"-is an invalid token");
//714:End
fh.EncryptFiles(myToken.GetToken( ));
}
Cursor = Cursors.Default;
this.Close( );
}
```

Turning back to FIG. 3, virtual desktop access may optionally include security level 2 which may be associated with user authentication, as shown at 308. As discussed in more detail with respect to FIGS. 4-8, a user may be authenticated via one or more of a username, password, biometric data, etc. Briefly, as shown in FIG. 3, user authentication may include communication between key 302 and server 304. For example, server 304 may send an encrypted file to key 302. The encrypted file may include one or more templates associated with a user of key 302. In this way, templates may be used to perform a matching operation to determine if a particular user is permitted to access a virtual desktop associated with key 302. It will be appreciated that one or more templates may be stored on server 304 and the encrypted file may include instructions that when executed, prompt a user to enter authentication data. In this way, authentication data may be exchanged back and forth between key 302 and server 304 in order to authenticate the user.

At 310, a user accesses a virtual desktop via any suitable virtual desktop infrastructure. As such, server 304 may send data to key 302 pertaining to the particular virtual desktop. Additionally, key 302 may send data to server 304 that indicates a change, addition and/or deletion associated with the virtual desktop. In this way, a record associated with the virtual desktop is updated on server 304. It will be appreciated that the record may be updated in real-time, in predetermined intervals, and/or when a user prompts an update during a virtual desktop session.

In this way, the security associated with a virtual desktop key is customizable. For example, the virtual desktop key may be configured for token validation without user authentication, thus providing a lower security option. Such an option may be desirable for multi-user access to a virtual desktop through a single virtual desktop key. For example, multiple employees may have access to a common workstation desktop when traveling. Alternatively, multiple users may remotely access the common workstation desktop after being authenticated. In this way, each user accessing the common workstation desktop may be identified and potentially tracked to create a manifest including information pertaining to each user's virtual desktop access session.

As another example, the virtual desktop key may be configured for token validation and user authentication, thus providing a higher security option. Such an option may be desirable for single-user access to a virtual desktop. For example, a user with confidential data may wish to remotely access their personal desktop and therefore may desire a higher level of security when launching a virtual desktop protocol.

Figure 4:
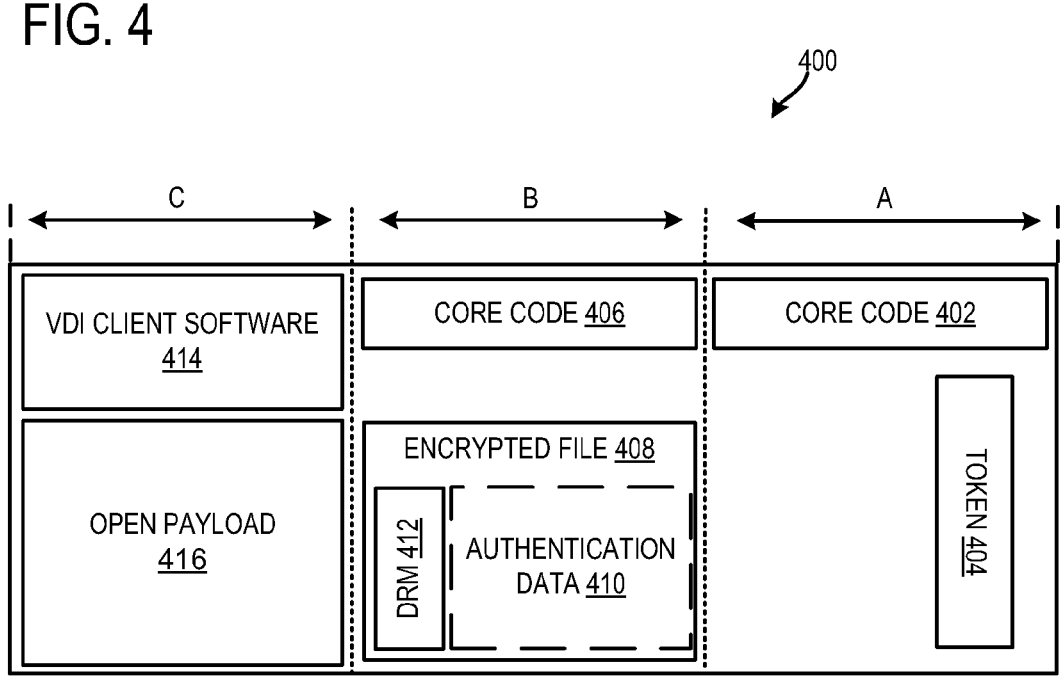
FIG. 4 shows an example configuration of a virtual desktop key for use in the virtual desktop access and management system shown in FIG. 1, according to an embodiment of the present disclosure.

FIG. 4 shows an example configuration of a virtual desktop key for use in the virtual desktop access and management system 10 of FIG. 1. As shown, key 400 may include Section A, Section B, and Section C. Each section may include different components or features of key 400. Further, each section may be organized in a hierarchical configuration. For example, verification components of Section A may grant access to components of Section B. Likewise, verification components of Section B may grant access to components of Section C. As such, key 400 may be configured with one or more levels of security.

Section A may include core code 402 and token 404. Core code 402 may be a fixed code, and may not be altered. For example, core code 402 may be stored in a ROM area of key 400; therefore core code 402 may be permanent. Core code 402 may contain instructions to be executed by a processor (e.g. processor 32 of FIG. 1). Such instructions may include executables to autorun a program connecting a remote computing device to a server, such as desktop access manager 50. An autorun may trigger validation of key 400 by validating token 404. Token 404 may be generated when the key is provisioned. Therefore, token 404 may be configured as a local identifier that is unique to key 400. As such, the local identifier may be stored in a ROM area of key 400, thus the local identifier may be permanent.

Section B may include core code 406 and encrypted file 408, such as an encrypted security file. Core code 406 may be a fixed code, and may or may not be altered. For example, core code 406 may be stored in a ROM/RAM area of key 400. Therefore, core code 406 may be permanent, writable, or may contain portions that are permanent while other portions may be writable. Core code 406 may contain instructions to be executed by a processor (e.g. processor 32 of FIG. 1). Such instructions may include executables that authenticate a user of key 400. Authentication may include more than one factor to identify a user. For example, a first factor may include authenticating a user via an account ID and/or password. A second factor may include a request for user identification information, such as biometric identification, including but not limited to fingerprint recognition, retina recognition and/or voice recognition. Authentication data 410 may be received as a component of encrypted file 408. For example, desktop access manager 50 may send encrypted data 408 to key 400 following validation of token 402.

Encrypted data 408 may include authentication data 410 as described above, and may also optionally include a digital signature such as DRM signature 412. The digital signature may include virtually any algorithm that enables key generation, encryption, and decryption. One or more key generation algorithms may select a private key at random from a set of possible private keys. The key generation algorithm may output the selected private key and a corresponding public key. Given a message and the selected private key, one or more encryption algorithms may generate a signature. The signature may be verified by one or more decryption algorithms, which may accept or reject the message's claim to authenticity based on the message, the public key and the signature.

Section C may include a virtual desktop protocol such as virtual desktop infrastructure (VDI) 414. VDI 414 may hold instructions that when executed by a processor (e.g. processor 32 of FIG. 1) enable a user to access Desktop A. VDI 414 may contain fixed or programmable instructions. It will be appreciated that virtual desktop key 400 may be configured for virtually any virtual desktop infrastructure software. In this way, virtual desktop key 400 is customizable for virtually any VDI client.

Section C may include an open payload 416 portion of key 400. As such, Section C may contain data of any type. As non-limiting examples, open payload 416 may include audio data, video data, application data, widget data, and/or other digital payloads. Data included in open payload 416 may be in any suitable format. For example, audio data may include data formatted as an mp3, mp4, wav or aiff file. Key 400 may be configured such that trace markers, such as temp files are not retained in open payload 416. Thus, key 400 may be configured so as to leave no trace and thereby increase the anonymity of key 400.

It will be appreciated that the above example key 400 is non-limiting and that other configurations are possible without departing from the spirit of the disclosure. For example, key 400 may be configured as one section rather than more than one section. Alternatively, key 400 may be configured such that there are more than three sections.

Figure 5:
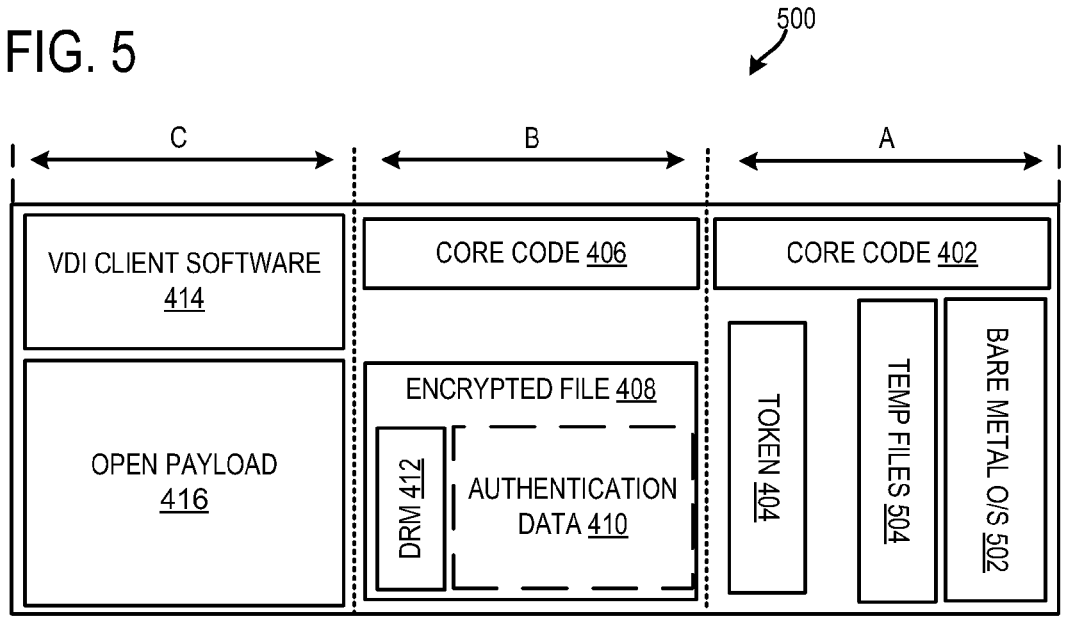
FIG. 5 shows another example configuration of a virtual desktop key for use in the virtual desktop access and management system shown in FIG. 1, according to an embodiment of the present disclosure.

FIG. 5 shows another example configuration of a virtual desktop key for use in the virtual desktop access and management system 10 of FIG. 1. As shown, key 500 may include Section A, Section B, and Section C. Each section may include components or features similar to those described above with respect to key 400 of FIG. 4 and therefore have common reference numbers. Similar features will not be discussed repetitively.

Section A of key 500 may further include bare metal operating system (O/S) 502 and temp files 504. O/S 502 may be provided on key 500 and may drive virtual desktop access rather than, or in addition to, the operating system of the computing device (e.g. second computing device 14 of FIG. 1). For example, core code 402 may trigger O/S 502 to load during an autorun. Once O/S 502 has loaded, temp files 504 may be temporarily stored within Section A. For example, temp files 504 may be provisioned each time O/S 502 loads, and temp files 504 may be deleted when a virtual desktop access session ends and key 500 is removed from a computing device. In this way, key 500 may optionally drive virtual desktop access without utilizing the operating system of the computing device.

FIG. 6 shows an example method 600 for user access to the virtual desktop access and management system of FIG. 1. Method 600 begins at 602 when a user inserts a key (e.g. virtual desktop key 18 of FIG. 1) into a computing device (e.g. second computing device 14 of FIG. 1). At 604, it is determined if the token associated with the key is validated. If the answer is no, the method ends at 606. If the answer is yes, method 600 proceeds to 608.

At 608, method 600 includes determining if an encrypted file exists on the key. If the answer is no, method 600 proceeds to 610. If the answer is yes, method 600 proceeds to 612.

At 612, an operating system or API executes instructions (e.g. core code 406) to delete the pre-existing encrypted file. When the virtual desktop key does not include a pre-existing encrypted file, method 600 includes at 610, transmitting an encrypted file from the server to the virtual desktop key via a network, as described above.

The encrypted file may include one or more templates that may be used to verify a user of the virtual desktop key. For example, the encrypted file may include one or more usernames and passwords to grant access to the virtual desktop key and/or the user's personal desktop. Further, the encrypted file may include one or more biometric templates that may be used to verify a user's biometric data.

At 614, method 600 may optionally include a user inputting biometric data for verification. For example, a user may place a thumb on a fingerprint scanner, which is provided as one non-limiting example. At 616, method 600 decides if the user biometric data input matches a stored user biometric template. For example, a stored user biometric template may be received as part of encrypted file 408 as described above. A match may be considered a match within a predetermined threshold value. For example, a match may be determined if the user input matches with at least 99% accuracy. If the answer to 616 is no, method 600 ends at 606. If the answer to 616 is yes, method 600 proceeds to 618.

At 618, a user is prompted to enter a username and a password. The username and password may be associated with granting access to the virtual desktop key and/or the user's personal desktop (e.g. Desktop A of FIG. 1). At 620, method 600 decides if the username and password validates the user. For example, the username and password may validate the user if the username and password matches a template. Such a template may be received as part of encrypted file 408 as described above. If the answer to 620 is no, method 600 ends at 606. If the answer to 620 is yes, method 600 proceeds to 622.

At 622, method 600 includes the operating system or API executing instructions (e.g. core code 406) to launch a virtual desktop protocol (e.g. VDI client software 414) thus granting access to the virtual desktop.

It will be appreciated that method 600 may include additional or alternative steps to validate a user and grant virtual desktop access. As such, method 600 is provided by way of example and is not meant to be limiting. Further, it will be appreciated that the example steps shown may be performed in any suitable order. For example, a user may be prompted to enter a username and password prior to inputting biometric data for verification.

In some embodiments, as briefly introduced above, method 600 may include more than one user name and password. For example, a first username and first password may be associated with the virtual desktop key and may grant access to the key when the user is verified. Method 600 may optionally include a second username and a second password that may be associated with a remote desktop and may grant access to the remote desktop when the user is verified. It will be appreciated that such a second username and password may be implemented before or after the API call to launch the virtual desktop protocol.

FIG. 7 shows an example method 700 for executing the virtual desktop access and management system of FIG. 1. Method 700 begins at 702 when a user inserts a virtual desktop key into a remote computing device. At 704, the method may optionally include executing autorun via the operating system. Autorun may execute under cold boot or warm boot conditions. The operating system may be an operating system of the computing device or may be bare metal O/S 502 as described above. As another example, virtual desktop access may be driven by an application programming interface (API). Autorun may trigger the execution of core code 402, as described above.

When included, at 706 method 700 determines if autorun is executed. If the answer to 706 is no, method 700 proceeds to 708 and the user receives an indication to manually run the executable, and method 700 advances to 710.

If the answer to 706 is yes, method 700 proceeds to 710 where an encrypted token file is sent from the key to a server (e.g., desktop access manager 50) via a network. From 710, method 700 proceeds to 712.

At 712, method 700 determines if the token is validated. If the answer to 712 is no, method 700 ends at 714. If the answer to 712 is yes, method 700 proceeds to 716.

At 716, method 700 includes sending a validation response from the server (desktop access manager) to the key. From 716, the method continues to 718.

From 718, method 700 continues to 720 of FIG. 8 which shows a continuation of the example method 700 of FIG. 7. At 720 the operating system (or API) executes instructions to search for a pre-existing encrypted file on the key. For example, such instructions may be included in core code 406 of a virtual desktop key. From 720, method 700 proceeds to 722.

At 722, method 700 determines if an encrypted file exists on the key. For example, an encrypted file may exist if the key had been previously used for a virtual desktop access session. In another example, the key may not contain an encrypted file which may indicate that they key is being used for a first virtual desktop access session. If the answer to 722 is yes, method 700 proceeds to 724 and the operating system (or API) executes instructions (e.g. core code 406) to delete the pre-existing encrypted file. From 724, the method proceeds to 726.

If the answer to 722 is no, method 700 proceeds to 726 where the desktop access manager sends a new encrypted file to the key. The encrypted file may include one or more authentication data templates and a DRM signature, as discussed above. In this way, an encrypted file is deleted each time the key is removed from a computing device and a new encrypted file is received at the beginning of each session. While the authentication data may not change with each encrypted file, portions of the DRM signature may change. For example, the encrypted file may include a new private key selected from a set of possible private keys for each virtual desktop access session. Therefore, a user experiences greater feeling of security when remotely accessing a desktop. From 726, method 700 proceeds to 728.

At 728, the operating system or API executes instructions (e.g. core code 406) that call to the encrypted file to trigger login credentials. For example, login credentials may include authentication data such as one or more usernames, one or more passwords and/or one or more biometric inputs as discussed above. From 728, method 700 proceeds to 730.

At 730, method 700 determines if the login credentials entered by the user match the authentication data templates in the encrypted file. If the answer to 730 is no, method 700 ends at 714. If the answer to 730 is yes, method 700 proceeds to 732.

At 732, the operating system (or API) executes instructions (e.g. core code 406) that call to a virtual desktop protocol. For example, the virtual desktop protocol may be a VDI based protocol such as VDI 414, a remote desktop protocol (RDP), a HTML based protocol, a DRM signature, or virtually any custom code. From 732, method 700 proceeds to 734.

At 734, method 700 includes the execution of the virtual desktop protocol on the computing device (e.g. second computing device 14 of FIG. 1). Thus, a user may remotely access a computing device and view the desktop of that particular computing device.

FIG. 9 shows an example method 900 for a session status check of the virtual desktop access and management system of FIG. 1. Method 900 begins at 902 and includes beginning a virtual desktop access session following validation of a user's login credentials, as discussed above. From 902, method 900 proceeds to 904.

At 904, method 900 includes maintaining the key in the computing device during the virtual desktop access session. From 904, method 900 proceeds to 906.

At 906, method 900 includes the server (desktop access manager) pinging the key, and the operating system (or API) performs a random session status check. From 906, method 900 proceeds to 908.

At 908, method 900 determines if the key responds to the session status check. If the answer to 908 is yes, method 900 proceeds to 910 and the virtual desktop access session continues. If the answer to 908 is no, method 900 proceeds to 912.

At 912, method 900 includes sending a kill session command from the server (desktop access manager) to the operating system (or API) to terminate the virtual desktop access session. From 912, method 900 proceeds to 914.

At 914, the server (desktop access manager) invalidates a hash code of the encrypted file. In this way, a key generated by a DRM signature is inhibited from granting access to a remote desktop when the virtual desktop key is inserted into a computing device again. Instead, the virtual desktop key receives a new encrypted file including a new DRM signature with each use as described above with respect to FIGS. 7 and 8. From 914, method 900 ends at 916.

FIG. 10 shows an example method 1000 for accessing a virtual desktop, in accordance with some embodiments of the present disclosure. Example method 1000 enables a user to access a user customized desktop through a remote computing device. As shown, the method may be implemented via second computing device 14, network 16 and desktop access manager 50 as shown in FIG. 1. However, in other embodiments, method 1000 may be implemented by other suitable systems, modules, components, etc.

Turning now to method 1000, at 1002, a user connects a virtual desktop key in a remote computing device with network access, such as Internet access. As an example, the virtual desktop key may be inserted through a USB connector of the computing device. The remote computing device recognizes the connection of the virtual desktop key and requests user identification.

At 1004, the user credential is verified for the virtual desktop key. If the virtual desktop key cannot be verified then the method ends at 1030. If the virtual desktop key is verified then the method continues at 1006. In some examples, the virtual desktop key is authenticated and validated by a server (such as the desktop access manager described above) and an SSL connection is made to the server. It should be appreciated that the virtual desktop key authentication may require user input of a password or other identifier. In other systems, the virtual desktop key authentication may occur automatically, without user input. Examples of virtual desktop key authentication are discussed above with respect to FIGS. 4-6.

If the verification of the virtual desktop key has been successful, at 1006, then an application may be launched to connect the remote computing device with the desktop manager. In some examples, the connection may be made through use of a public network, such as the Internet, and a private tunnel with SSL.

Additional security may be provided in some systems. For example, although not required, in some examples, a user identification code may be inputted at 308. In some systems, input of the proper user identification code may enable access to the user's desktop at 1010. The user identification code may include a user name and password or other user identification information.

In some systems, additional security layers may be provided in addition or instead of the user identification input. For example, at 1009, in some systems, a security code such as an RSA code may be required. Upon successful entry of the user identification code and the RSA code, access to the user desktop may be enabled, at 1010. Failure to provide the proper identification code or RSA code may end the process, at 1030. Examples of virtual desktop key security are discussed above with respect to FIGS. 4, 5, 7, and 8.

Upon access to the user desktop, the user's graphical display is provided on the remote computing device. Depending on the preset configuration, components of the user's desktop are mapped to the virtual desktop displayed on the remote computing device. In some examples, substantially all or all of the components of the user's desktop are mapped to the virtual desktop displayed on the remote computing device. For example, a USB, clipboard and printers, scanners, etc. may be remapped to the remote computing virtual desktop.

At 1012, removal of the virtual desktop key terminates the remote computing virtual desktop. In some examples, removal of the virtual desktop key may trigger a time countdown, where after a set time of being disconnected, the active virtual desktop session will be closed. In other examples, removal of the virtual desktop key may automatically trigger immediate termination of the virtual desktop session. The user may be automatically logged out upon such termination such that verification and reentry of user identification codes are necessary for restarting access to the virtual desktop. It should be appreciated that in some examples, a user may selectively log off, as indicated at 1014, effectively terminating the access to the virtual user desktop. In some examples, the desktop access manager may periodically check the status of a virtual desktop access session, as discussed above with respect to FIG. 9.

The above method 1000 provides a connection between the desktop access manager (and the user's desktop) and the virtual desktop key through the USB software where the connection is secure and encrypted. It is noted that the virtual desktop key may be locked preventing alteration once configured for use with the desktop access manager to enable access to a specific desktop.

In some systems, securities may further be provided to reduce potential concerns regarding loss or fraudulent attempts to access a user's virtual desktop key through a misplaced or lost key. For example, in some systems, after a preset number of access attempts to authenticate and provide identification data, the virtual desktop key may be locked or erased to provide user protection.

It should be appreciated that the above system and method may be used in a wide variety of environments. For example, in small businesses, users may struggle with finding easy to employ solutions which provide for remote access to their systems.

In one example, such as for small and medium sized businesses, the concept of hosting carries ambiguity and uncertainty due to costs and complexities with current systems. The virtual desktop key makes hosting simplified and virtual. In combination with the desktop access manager, the virtual desktop key reduces a business' physical infrastructure and administrative costs. Specifically, the use of the desktop access manager results in use of fewer onsite servers and related hardware, real estate, power and cooling requirements which enable easier management of the business solution and may reduce the environmental impact. Such reduction in resources supports environmental concerns of current systems. For example, in some systems, administrative tasks including maintenance, software upgrades and patch deployment are managed by the desktop access manager in a secure and private cloud with the same quality as the enterprise cloud offerings.

From the usability perspective, the virtual desktop key may be provided to employees in the same way that parking cards or access cards for entry to company properties are given. The virtual desktop key may be a dedicated key to a single employee or group of employees. The subsequent virtual hosting services provided by the desktop access manager empowers the small and medium size businesses to focus on their business priorities that impact their performance and bottom line rather than keeping track of hardware and software infrastructure and dependencies which produces administration nightmare.

Further, it is noted that in some systems, specific types of access features may be provided on the virtual desktop key. Thus, features may be selectively preset for access depending on the user receiving a specific virtual desktop key. Thus, a business provide access levels to only certain features of a user's desktop depending on the employee or group of employees. The virtual desktop key can be configured to correspond with the access levels selected for the user.

In addition to ease of IT administration, the desktop access management system provides a higher level of efficiency and consistency of desktop environments within a business. In some current systems, an IT department may set up and deploy applications and resources such as accounting CRM, ERP or portals for the on-site business, but offering the same systems outside of the business site may be expensive and difficult. For example, such systems are limited when employees are at a client site in front of a system and need immediate access to information on their desktop.

In contrast, the present system and method provides access through the virtual desktop key and the desktop access manager access to a user's entire virtual desktop including applications, configurations and files increasing user efficiency and improving user experience. The system and method provide users with manageability and security for local or remote access through network connection on all standard desktops or laptops. Connecting the virtual access key in a networked system and logging in enables substantially instant access directly to a user's desktop, where the user's desktop is familiar and pre-configured to the user's business needs.

The systems and methods described herein allow a user to easily and securely access a user desktop from a remote computing device. The desktop access manager provides a management system which enables ease of administration and deployment of the associated virtual desktop keys. The use of the virtual desktop keys prevents a user from the necessity of carrying a laptop or having to navigate the complicated access systems currently available. Further, by providing a single desktop access manger, a plurality of businesses can share the IT costs without compromising security.

It should be appreciated that a use example has been provided above in regards to use of a virtual desktop key with small and medium sized businesses. As such, in the described example, a virtual desktop key may be provided to employees to enable the employee to have access to their desktop and workstation. However, it should be appreciated, that the virtual desktop key may also be used for personal connections or in other environments. For example, the virtual desktop key may provide secure access to a desktop available only to a selected group of users. For example, a virtual desktop key may be provided to students at a university or school enabling access to certain applications or programs which are available only to students. In other systems, a virtual desktop key may be provided to teachers enabling a second level of access to a desktop system and related applications. Further, in other examples, businesses may use the virtual desktop keys as promotional items where access provides access to a customized desktop or application. In even other examples, the virtual desktop key may provide access to a gaming platform or user's customized position in a gaming platform.

As another example, the virtual desktop key may provide access to authorized users of a service site. For example, the virtual desktop key may provide access to a remote desktop that allows viewing of movies or television shows. A virtual desktop key may be customized to the user allowing specific levels of access depending on membership or other criteria. As such, a user can have a subscription to a service site and then use the key which can verify the user's subscription and provide access to the service (such as playing movies or enabling selection of movies for viewing).

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The invention claimed is:

1. A virtual desktop access and management system for accessing a desktop interface from a second computing device, the system comprising:
   a removable physical virtual desktop key receivable in a communication port of the second computing device which is communicatively linked to a network, the removable physical virtual desktop key including a first section and a second section, where the first section includes a token and the second section includes an open payload portion, the token communicatively linking the second computing device with an encrypted security file, and where the second section includes memory storing code holding instructions for executing a virtual desktop access application stored on the removable physical virtual desktop key;
   where the token includes a unique identifier associated with the removable physical virtual desktop key;
   where validating the token provides access to the encrypted security file and where authenticating the encrypted security file opens the second section including the payload portion of the removable physical virtual desktop key and executes the virtual desktop access application from the removable physical virtual desktop key, where the payload portion is communicatively linked to a first computing device over the network and where execution of the virtual desktop access application from the removable physical virtual desktop key on the second computing device triggers a remote launch of a virtual desktop by enabling the second computing device to access the first computing device over the network wherein the virtual desktop is displayed on the second computing device and wherein the virtual desktop is a gateway to the first computing device.

2. The system of claim 1, further comprising a desktop access manager connected to the first computing device and the second computing device via the network.

3. The system of claim 2, wherein the desktop access manager validates the removable physical virtual desktop key.

4. The system of claim 1, wherein the second section includes memory storing instructions to terminate execution of the virtual desktop application upon removal of the removable physical virtual desktop key from the communication port of the second computing device.

5. The system of claim 1, wherein the removable physical virtual desktop key includes read-only memory and/or random access memory.

6. The system of claim 5, further including one or more codes holding instructions for executing token validation and user authentication.

7. The system of claim 6, wherein the removable physical virtual desktop key further includes a bare metal operating system that executes one or more core codes.

8. The system of claim 1, wherein the encrypted security file includes a DRM signature, a biometric data template, and one or more login credentials.

9. A method for remotely accessing a first computing device from a second computing device, the first and second computing devices in communication via a network, the method comprising:
receiving a removable physical virtual desktop key into a communication port of the second computing device communicatively linked to the network;
wherein the removable physical virtual desktop key includes memory storing code holding instructions for executing a virtual desktop access application stored on the removable physical virtual desktop key;
verifying a token of the removable physical virtual desktop key through the network, the token including a unique identifier associated with the removable physical virtual desktop key;
receiving an encrypted security file; and
authenticating a user of the removable physical virtual desktop key through the encrypted security file, and if authentication is verified:
launching the virtual desktop access application from the removable physical virtual desktop key to trigger a remote launch of a virtual desktop by enabling the second computing device to access the first computing device over the network, wherein the virtual desktop is displayed on the second computing device and wherein the virtual desktop is a gateway to the first computing device.

10. The method of claim 9, wherein a first encrypted file corresponding to a first session is replaced by a second encrypted file when the user requests a second session.

11. The method of claim 9, wherein the encrypted file includes a DRM signature, a biometric data template, and one or more login credentials.

12. The method of claim 11, further including matching a user input with a template.

13. The method of claim 9, wherein token validation further includes sending a token to a virtual desktop access manager and receiving an indication confirming or denying token validation from the virtual desktop access manager.

14. The method of claim 9, wherein user authentication includes verifying biometric data, a username, and a password with a corresponding template.

15. The method of claim 9, wherein if user authentication is not verified, denying access to the first computing device.

16. The method of claim 9, wherein launching the application to connect the second computing device to the first computing device occurs through a connection via the network and a private tunnel with SSL.

17. The method of claim 9, wherein the removable physical virtual desktop key includes read-only memory and/or random access memory, holding instructions for executing token validation, user authentication, and virtual desktop access.

18. The method of claim 17, wherein the removable physical virtual desktop key further includes a bare metal operating system that executes the instructions.

19. The method of claim 9, wherein the communication port is a USB port.

20. A method for remotely accessing a first computing device from a second computing device, the computing devices in communication with a virtual desktop manager via a network, the method comprising:
receiving a removable physical virtual desktop key into a communication port of the second computing device;
wherein the removable physical virtual desktop key includes memory storing code holding instructions for executing a virtual desktop access application on the removable physical virtual desktop key;
connecting the second computing device to a desktop access manager;
sending a token from the removable physical virtual desktop key to the desktop access manager to validate the removable physical virtual desktop key, the token including a unique identifier associated with the removable physical virtual desktop key;
receiving token validation from the desktop access manager if the token is verified;
receiving an encrypted security file from the desktop access manager; and
authenticating a user of the removable physical virtual desktop key, and if authentication is verified:
launching the virtual desktop access application from the removable physical virtual desktop key application to trigger a remote launch of a virtual desktop by enabling the second computing device to access the first computing device over the network, wherein the virtual desktop is a gateway to the first computing device.

21. A removable physical virtual desktop key for accessing a desktop interface of a first computing device from a second computing device, the removable physical virtual desktop key comprising:
a first section storing first instructions executable to validate a token of the removable physical virtual desktop key;
a second section storing second instructions executable to authenticate a user of the removable physical virtual desktop key, the authentication of the user provided by an encrypted file accessible after validation of the token; and
a third section storing third instructions executable from the removable physical virtual desktop key to trigger a remote launch of a virtual desktop by enabling the second computing device to access the first computing device, the third instructions executed after the authentication of the user,
where the removable physical virtual desktop key is a separate device removable from the first computing device and the second computing device, and where the first, second, and third instructions stored on the removable physical virtual desktop key are executed by a processor of the second computing device to perform the steps of:

connecting the second computing device to a desktop access manager;

sending the token from the removable physical virtual desktop key to the desktop access manager to validate the removable physical virtual desktop key, the token including a unique identifier associated with the removable physical virtual desktop key;

receiving token validation from the desktop access manager if the token is verified;

receiving the encrypted file from the desktop access manager; and authenticating the user of the removable physical virtual desktop key, and if authentication is verified:

launching a virtual desktop access application from the removable physical virtual desktop key to trigger the remote launch of the virtual desktop by enabling the second computing device to access the first computing device over a network, wherein the virtual desktop is a gateway to the first computing device.

* * * * *